United States Patent
Zhang et al.

(10) Patent No.: US 8,206,142 B2
(45) Date of Patent: Jun. 26, 2012

(54) HYDRAULIC LOCKING MECHANISM FOR MULTIPLE EXTRUSION HEADS OF AN EXTRUDER

(75) Inventors: Zhiquan Zhang, Tianjin (CN); Jianhao Zhang, Tianjin (CN)

(73) Assignee: Tianjin Saixiang Technology Co., Ltd., Tianjin (CN)

( * ) Notice: Subject to any disclaimer, the term of this patent is extended or adjusted under 35 U.S.C. 154(b) by 78 days.

(21) Appl. No.: 12/824,258

(22) Filed: Jun. 28, 2010

(65) Prior Publication Data
US 2011/0097435 A1  Apr. 28, 2011

(30) Foreign Application Priority Data
Oct. 27, 2009  (CN) .......................... 2009 1 0070968

(51) Int. Cl.
*B29C 47/12* (2006.01)
(52) U.S. Cl. ...................... 425/190; 425/188; 425/192 R
(58) Field of Classification Search .................. 425/188, 425/190, 192 R, 376.1
See application file for complete search history.

(56) References Cited

U.S. PATENT DOCUMENTS

| | | | |
|---|---|---|---|
| 4,642,039 A * | 2/1987 | Anders | 425/192 R |
| 4,728,279 A * | 3/1988 | Bellmer | 425/192 R |
| 4,799,874 A * | 1/1989 | Bellmer et al. | 425/192 R |
| 5,061,166 A * | 10/1991 | Gohlisch et al. | 425/188 |
| 5,720,986 A * | 2/1998 | Gohlisch et al. | 425/192 R |
| 7,704,064 B2 * | 4/2010 | Unland et al. | 425/192 R |

* cited by examiner

Primary Examiner — James Mackey
(74) Attorney, Agent, or Firm — Matthias Scholl P.C.; Matthias Scholl

(57) ABSTRACT

A hydraulic locking mechanism for multiple extrusion heads of an extruder, has two Y-shaped clamping arms, six wedges, six pushing bars, six oil cylinder brackets, six oil cylinders, and six locking holes. A pair of locking holes is formed on both sides of an upper portion and a lower portion of the barrel and the extrusion head thereof, respectively. The wedge is disposed on inner wall of the locking hole, and a locking hole thereof has a sectional area gradually decreasing from the outside to the inside. The clamping arms are disposed on both sides of the barrel and the extrusion head via fastening devices. A through hole for the pushing bar is disposed on a branch of each of the clamping arm and corresponds to six locking holes. A piston rod of the oil cylinder is connected to a rear end of the pushing bar, the six oil cylinders and the six pushing bars are respectively fixed on six branches of the two clamping arms via six brackets of an oil cylinder. The pushing bar is capable of moving along the through hole for the pushing bar as being driven by the oil cylinder, and a front end thereof is inserted in the locking hole and penetrably disposed in the through hole for the pushing bar. A slant is formed on the outer side on a front end of the pushing bar.

13 Claims, 2 Drawing Sheets

HYDRAULIC LOCKING MECHANISM FOR MULTIPLE EXTRUSION HEADS OF AN EXTRUDER

CROSS-REFERENCE TO RELATED APPLICATIONS

Pursuant to 35 U.S.C. §119 and the Paris Convention Treaty, this application claims the benefit of Chinese Patent Application No. 200910070968.0 filed on Oct. 27, 2009, the contents of which are incorporated herein by reference.

BACKGROUND OF THE INVENTION

1. Field of the Invention

The invention relates to a field of rubber tire mechanism, and more particularly to a hydraulic locking mechanism for multiple extrusion heads.

2. Description of the Related Art

An extruder is the important equipment used in the production of radial tires, and comprises components such as a barrel, an extrusion head and so on. During production, a locking device is used to lock the extrusion head; otherwise rubber leakage may occur at the extrusion head under pressure of rubber compound. Locking devices for conventional extruders have the following problems: 1. the angle between a locking force and a sealing surface is too small and thus the locking force is not large enough; and 2. not all the sealing surfaces can be included, and thus sealing effect is not good.

SUMMARY OF THE INVENTION

In view of the above-described problem, it is one objective of the invention to provide a hydraulic locking mechanism for multiple extrusion heads that features reasonable design of structure, good sealing effect and safety, and a simple and convenient operating process.

To achieve the above objectives, in accordance with one embodiment of the invention, provided is a hydraulic locking mechanism for multiple extrusion heads, comprising two Y-shaped clamping arms, six wedges, six pushing bars, six oil cylinder brackets, six oil cylinder, and six locking holes, one locking hole is formed on a barrel and a pair of locking holes are respectively formed on both sides of an upper portion and a lower portion of the barrel and an extrusion head thereof, the wedge is disposed on inner wall of the locking hole, and a locking hole thereof has a sectional area gradually increasing from the outside to the inside, the clamping arms are disposed symmetrically on both sides of the barrel and the extrusion head via fastening devices, a through hole for each pushing bar is disposed on a branch of each of the clamping arm and corresponds to six locking holes, a piston rod of the oil cylinder is connected to a rear end of the pushing bar, the six oil cylinders and the six pushing bars are respectively fixed on six branches of the two clamping arms via six brackets of an oil cylinder, the pushing bar is capable of moving along the through hole for the pushing bar as being driven by the oil cylinder, and the front end thereof is inserted in the locking hole and penetrably disposed in the through hole for the pushing bar, and a slant is formed on an outer side on the front end of the pushing bar.

In a class of this embodiment, the slant on the wedge is parallel to the slant on the pushing bar.

In a class of this embodiment, a normal of the slant on the wedge points to a geometric center of the clamping arm.

In a class of this embodiment, a normal of the slant on the pushing bar points to a geometric center of the clamping arm.

In a class of this embodiment, a cross section of the pushing bar is circular or rectangular as a cross section of the locking hole is circular or rectangular.

In a class of this embodiment, an angle between the slant on the pushing bar and an axis of the pushing bar is 8°.

Advantages of the hydraulic locking mechanism for multiple extrusion heads of the invention comprise:

1. Locking force is reasonably applied and loss thereof is negligible, branches of the clamping arm are distributed according to sealing surfaces of the extrusion head, which enables all the sealing surfaces to be considered, and an angle between the locking force and each sealing surface is above 40°, which improves utilization of the locking force.

2. Locking force is applied in three directions and converged into one point, and the clamping arm is reasonably and stably forced. Since a geometric intersection of three branches of the clamping arm is a convergent point of the locking force, only pulling force in an axial direction is applied to all branches of the clamping arm, and thus stability of the pulling force is good.

3. The clamping arm is fixed, and thus power consumption, inertial impact, and safety danger generated during movement of large components do not exist. In addition, during locking, only the pushing bar moves in the through holes of the clamping arm and the extrusion head, and other components stay still, and thus safety of the invention is good.

4. The lock and release process of the invention is simple and fast, and thus auxiliary time for production is reduced, and the invention features high efficiency.

DETAILED DESCRIPTION OF THE EMBODIMENTS

Figure 1:
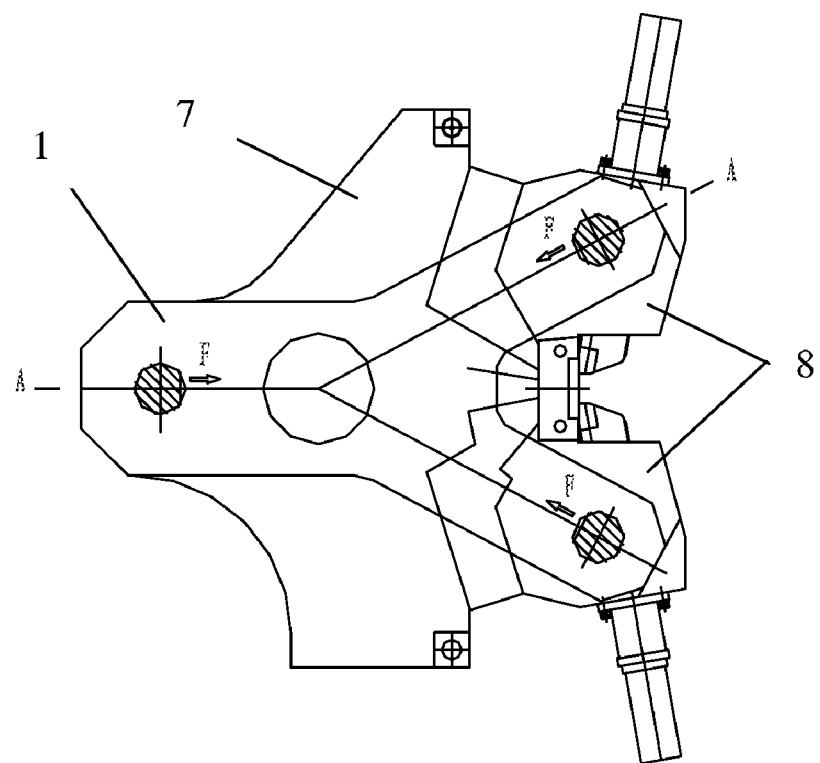
FIG. 1 is a front view of a hydraulic locking mechanism for multiple extrusion heads of the invention.
Figure 2:
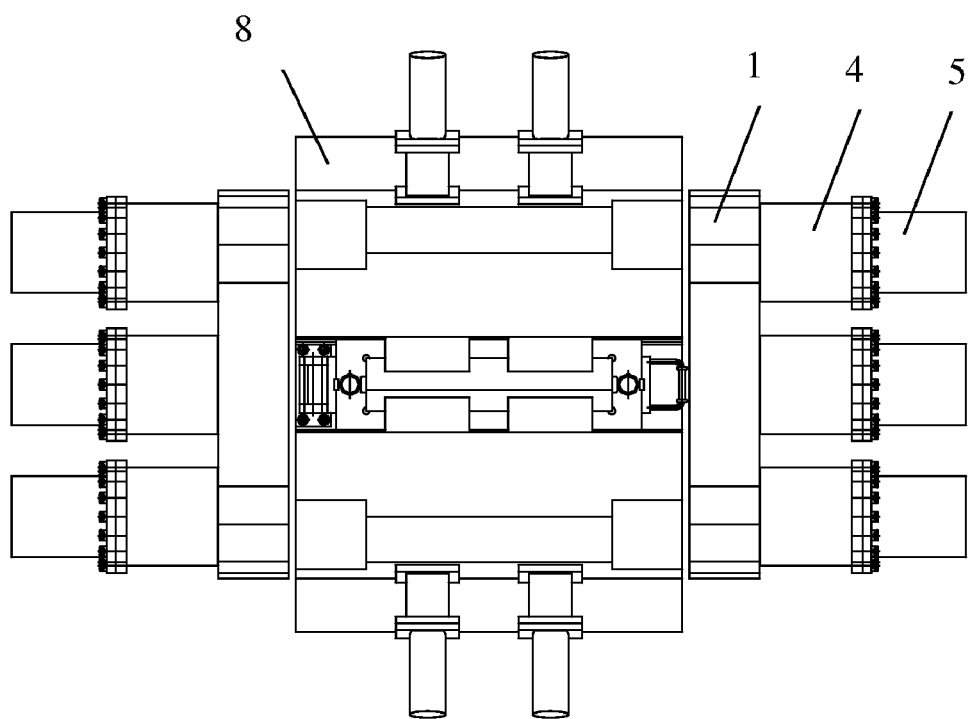
FIG. 2 is a side view of a hydraulic locking mechanism for multiple extrusion heads of the invention.
Figure 3:
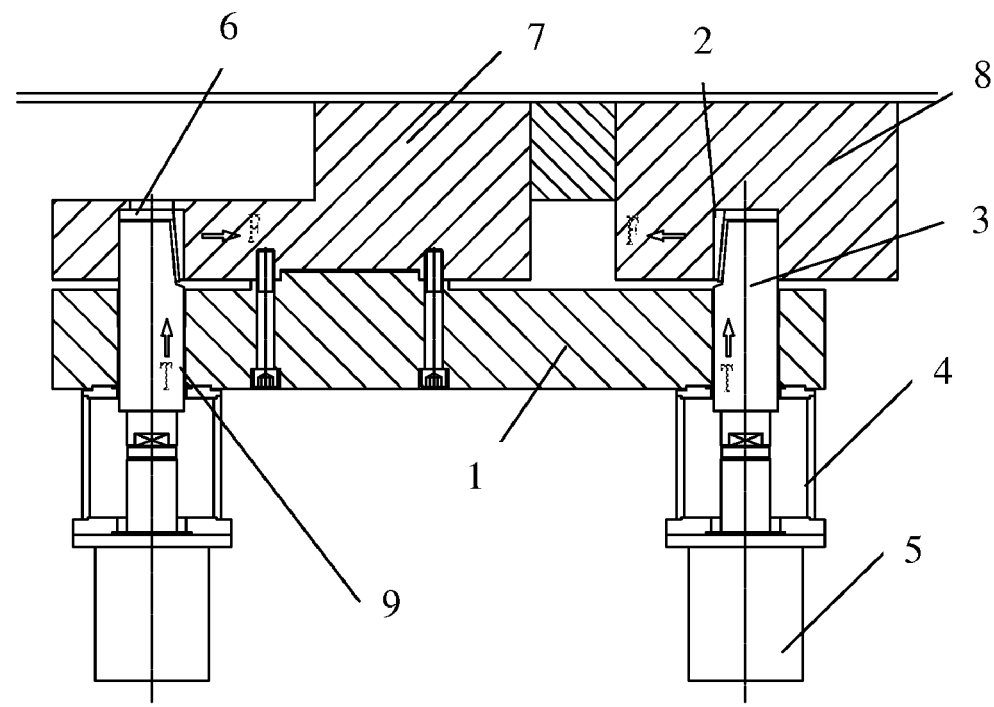
FIG. 3 is a cross-sectional view of FIG. 1 along an A-A line.

Further description of the invention will be given below in conjunction with accompanying drawings and specific embodiments.

As shown in FIGS. 1-4, a hydraulic locking mechanism for multiple extrusion heads of the invention comprises two Y-shaped clamping arms 1, six wedges 2, six pushing bars 3, six oil cylinder brackets 4, six oil cylinder 5, and six locking holes 6. A pair of locking holes 6 are respectively formed on both sides of an upper portion and a lower portion of the a barrel 7 and an extrusion head 8 thereof, the wedge 2 is disposed on inner wall of the locking hole 6, and a locking hole 6 thereof has a sectional area gradually decreasing from the outside to the inside, the clamping arms 1 are symmetrically disposed on both sides of the barrel 7 and the extrusion head 8 via fastening devices, a through hole 9 for the pushing bar is disposed on a branch of each of the clamping arm 1 and corresponds to six locking holes 6, a piston rod of the oil cylinder 5 is connected to a rear end of the pushing bar 3, the six oil cylinders 5 and the six pushing bars 3 are respectively fixed on six branches of the two clamping arms 1 via six brackets of an oil cylinder 4, the pushing bar 3 is capable of moving along the through hole 9 for the pushing bar 3 as being driven by the oil cylinder 5, and a front end thereof is inserted in the locking hole 6 and penetrably disposed in the through hole 9 for the pushing bar, and a slant 10 is formed on an outer side on a front end of the pushing bar 3.

The slant 11 on the wedge 2 is parallel to the slant 10 on the pushing bar 3.

A normal of the slant 11 on the wedge 2 points to a geometric center of the clamping arm 1.

A normal of the slant 10 on the pushing bar 3 points to a geometric center of the clamping arm 1.

A cross section of the pushing bar 3 is circular or rectangular as a cross section of the locking hole 6 is circular or rectangular.

An angle between the slant 10 on the pushing bar 3 and an axis of the pushing bar 3 is 8°.

Figure 4:
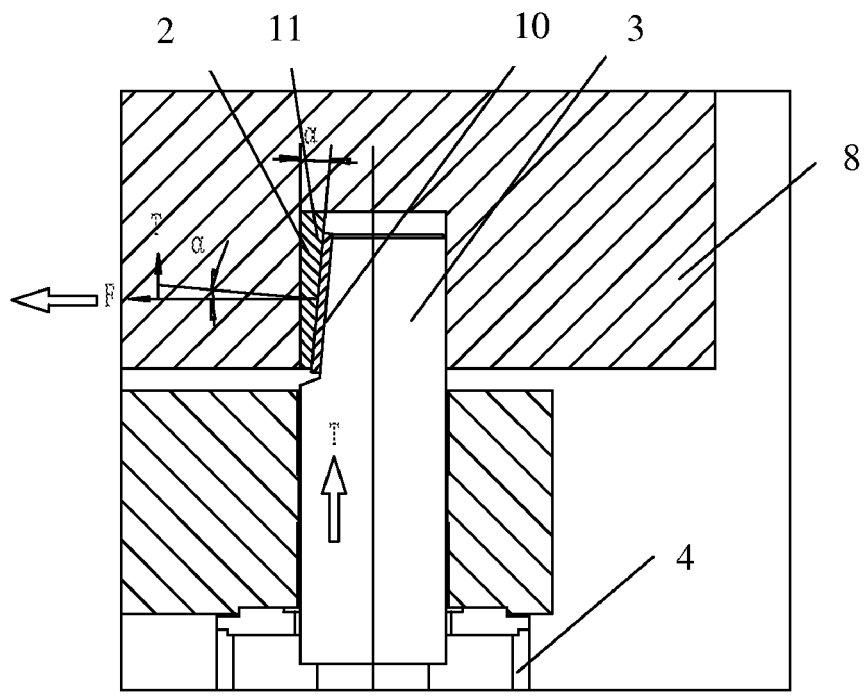
FIG. 4 is a partially enlarged view of FIG. 3.

As the hydraulic locking mechanism for multiple extrusion heads of the invention is used for locking the extrusion head 8, firstly all flexible parts of the extrusion head 8 are closed, and six oil cylinders 5 drive six pushing bars 3 to move forwards, whereby enabling the front of the pushing bar 3 to extends from the through hole 9 and to enter the locking hole 6, until the slant 10 on the pushing bar 3 is contacted with the slant 11 on the wedge 2. Then hydraulic oil in the oil cylinder 5 is kept within a certain pressure range. As shown in FIG. 4, pushing force T generated by the hydraulic oil in the oil cylinder 5 is transferred to the wedge 2 via the pushing bar 3, and thus a locking force F vertical to the wedge 2 is generated and points to a same intersection. Therefore, reacting force applied to the clamping arm 1 has no torque, but only pulling force converging into one point along an axis thereof, and thus a stable and closing mechanical system is formed. Namely, clamping force applied in three directions and converging into one point is imposed on the extrusion head 8, pressing stress of the sealing surfaces is large enough to overcome pressure of rubber compound, and thus rubber leakage occurs at the extrusion head 8. As the extrusion head 8 is to be released, six oil cylinders 5 are used to retract six pushing bars 3, whereby enabling the locking force F to disappear until the pushing bar 6 is completely received in the through hole 9 for the pushing bar on the clamping arm 1 and opening space of a flexible part of the extrusion head 8 is left.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A hydraulic locking mechanism for multiple extrusion heads of an extruder, comprising:
   two Y-shaped clamping arms (1), each having three arms;
   six wedges (2);
   six pushing bars (3), each having a front end and a slant (10) on an outer side of said front end;
   six oil cylinder brackets (4);
   six oil cylinders (5);
   six piston rods;
   six locking holes (6), each having an inner wall;
   a barrel (7),
   an extrusion head (8),
   six through holes (9); and
   six branches each defined by one of said arms of each of said two Y-shaped clamping arms;
   wherein
   said Y-shaped clamping arms (1) are symmetrically disposed on both sides of said barrel (7) and said extrusion head (8) via fastening devices;
   is respectively formed on both sides of said barrel (7) and both sides of an upper portion and a lower portion of said extrusion head (8)
   said six oil cylinders (5) are fixed each on one of said six branches via said six oil cylinder brackets (4), respectively;
   said through holes (9) are disposed each in one of said branches, and are disposed each at an opening of one of said oil cylinders (5);
   each of said locking holes (6) is formed on both sides of an upper portion and a lower portion of said barrel (7) and said extrusion head (8), and said locking holes (6) and adjacent each to one of said through holes (9);
   said wedges (2) are disposed each on the inner wall of one of said locking holes (6), and each of said wedges (2) has a sectional area gradually decreasing in a direction away from said locking holes (6);
   said piston rods are disposed each within one of said six oil cylinders (5); and
   said pushing bars (3) are penetrably disposed each in one of said through holes (9) and are connected each at a rear end thereof to one of said piston rods, whereby when said pushing bars (3) are driven by said oil cylinders (5) to move along said through holes (9), said front ends are inserted into said locking holes (6).

2. The hydraulic locking mechanism of claim 1, wherein a slant (11) on said wedges (2) is parallel to said slant (10) on said pushing bars (3).

3. The hydraulic locking mechanism of claim 1, wherein a slant (11) on said wedges (2) points to a geometric center of said clamping arms (1).

4. The hydraulic locking mechanism of claim 1, wherein said slant (10) on said pushing bars (3) points to a geometric center of said clamping arms (1).

5. The hydraulic locking mechanism of claim 1, wherein a cross section of said pushing bars (3) is circular or rectangular and a cross section of said locking holes (6) is circular or rectangular.

6. The hydraulic locking mechanism of claim 1, wherein an angle between said slant (10) on said pushing bars (3) and an axis of said pushing bars (3) is about 8°.

7. A hydraulic locking mechanism for multiple extrusion heads of an extruder, comprising:
   two clamps (1), each having three arms that form a Y-shape;
   six wedges (2);
   six pushing bars (3), each having a front end and a slant (10) on an outer side of said front end;
   six oil cylinder brackets (4);
   six oil cylinders (5);
   six piston rods;
   six locking holes (6), each having an inner wall;
   a barrel (7),
   an extrusion head (8), and
   six through holes (9);
   wherein
   said clamps (1) are symmetrically disposed on both sides of said barrel (7) and said extrusion head (8) via fastening devices;
   said six oil cylinder brackets (4) are connected with and are perpendicular to said arms of the two clamps (1), respectively;
   said six oil cylinders (5) are fixed each by one of said six oil cylinder brackets (4);
   said through holes (9) penetrate said arms respectively, and are disposed each at an opening of one of said oil cylinders (5);

each of said locking holes (6) is respectively formed on both sides of said barrel (7) and both sides of an upper portion and a lower portion of said extrusion head (8), and said locking holes (6) are adjacent each to one of said through holes (9);

said wedges (2) are disposed each on the inner wall of one of said locking holes (6), and each of said wedges (2) has a sectional area gradually decreasing in a direction away from said locking holes (6);

said piston rods are disposed each within one of said six oil cylinders (5); and said pushing bars (3) are penetrably disposed each in one of said through holes (9) and are connected each at a rear end thereof to one of said piston rods, whereby when said pushing bars (3) are driven by said oil cylinders (5) to move along said through holes (9), said front ends are inserted into said locking holes (6).

8. The hydraulic locking mechanism of claim 7, wherein a slant (11) on said wedges (2) is parallel to said slant (10) on said pushing bars (3).

9. The hydraulic locking mechanism of claim 7, wherein a slant (11) on said wedges (2) points to a geometric center of said clamps (1).

10. The hydraulic locking mechanism of claim 7, wherein said slant (10) on said pushing bars (3) points to a geometric center of said clamps (1).

11. The hydraulic locking mechanism of claim 7, wherein a cross section of said pushing bars (3) is circular or rectangular and a cross section of said locking holes (6) is circular or rectangular.

12. The hydraulic locking mechanism of claim 7, wherein an angle between said slant (10) on said pushing bars (3) and an axis of said pushing bars (3) is about 8°.

13. A hydraulic locking mechanism for multiple extrusion heads of an extruder, wherein two Y-shaped clamping arms (1) are disposed on respective sides of a barrel (7) and an extrusion head (8) via fastening devices, a through hole (9) is formed in each of three branches of each of said clamping arms (1), six corresponding locking holes (6) are respectively formed on both sides of the barrel (7) and both sides of upper and lower portions of the extrusion head (8), a wedge (2) is disposed on an inner wall of each of said locking holes (6) whereby a remaining unoccupied space of each of said locking holes (6) has a gradually decreasing sectional area, an oil cylinder (5) is fixed via a respective oil cylinder bracket (4) onto a respective one of the six branches of the two clamping arms (1), a pushing bar (3) is connected at a rear end thereof to a respective piston rod of each said oil cylinder (5), and a slant (10) is formed on an outer side of a front end of each said pushing bar (3), whereby when said pushing bar (3) is driven by said oil cylinder (5) to move along said through hole (9), the front end of each said pushing bar (3) is inserted into a respective one of said locking holes (6).

\* \* \* \* \*